United States Patent [19]
Venkatesh et al.

[11] Patent Number: 5,646,734
[45] Date of Patent: Jul. 8, 1997

[54] METHOD AND APPARATUS FOR INDEPENDENTLY MEASURING THE THICKNESS AND INDEX OF REFRACTION OF FILMS USING LOW COHERENCE REFLECTOMETRY

[75] Inventors: Shalini Venkatesh, Santa Clara; Wayne V. Sorin, Mountain View, both of Calif.

[73] Assignee: Hewlett-Packard Company, Palo Alto, Calif.

[21] Appl. No.: 520,200

[22] Filed: Aug. 28, 1995

[51] Int. Cl.$^6$ .................... G01B 9/02; G01B 11/06
[52] U.S. Cl. ............... 356/382; 356/381; 356/357
[58] Field of Search .................... 356/357, 355, 356/345, 381, 382, 361

[56] References Cited

U.S. PATENT DOCUMENTS

| | | | |
|---|---|---|---|
| 4,453,828 | 6/1984 | Hershel et al. | 356/357 |
| 5,323,229 | 6/1994 | May et al. | 356/357 |

Primary Examiner—Frank G. Font
Assistant Examiner—Amanda Merlino

[57] ABSTRACT

An apparatus and method for measuring the thickness of a film having top and bottom surfaces. The apparatus includes a first coupler for generating a first probe light signal and a second probe light signal from a low coherence light source. The first probe light signal is directed toward the top surface of the film at a first angle of incidence and the light leaving the top surface of the film is collected. Similarly, the second probe light signal is directed toward the top surface of the film at a second angle of incidence different from said first angle of incidence and the light leaving the top surface of the film is also collected. The collected light is combined to form a collected light signal which is input to a receiver that determines the time delay between light reflected from the top and bottom surfaces of the film. In the preferred embodiment of the present invention, the receiver is constructed from an optical autocorrelator or an optical spectrum analyzer that includes circuitry for providing the Fourier transform of the frequency domain spectrum measured from the combined light signal.

8 Claims, 5 Drawing Sheets

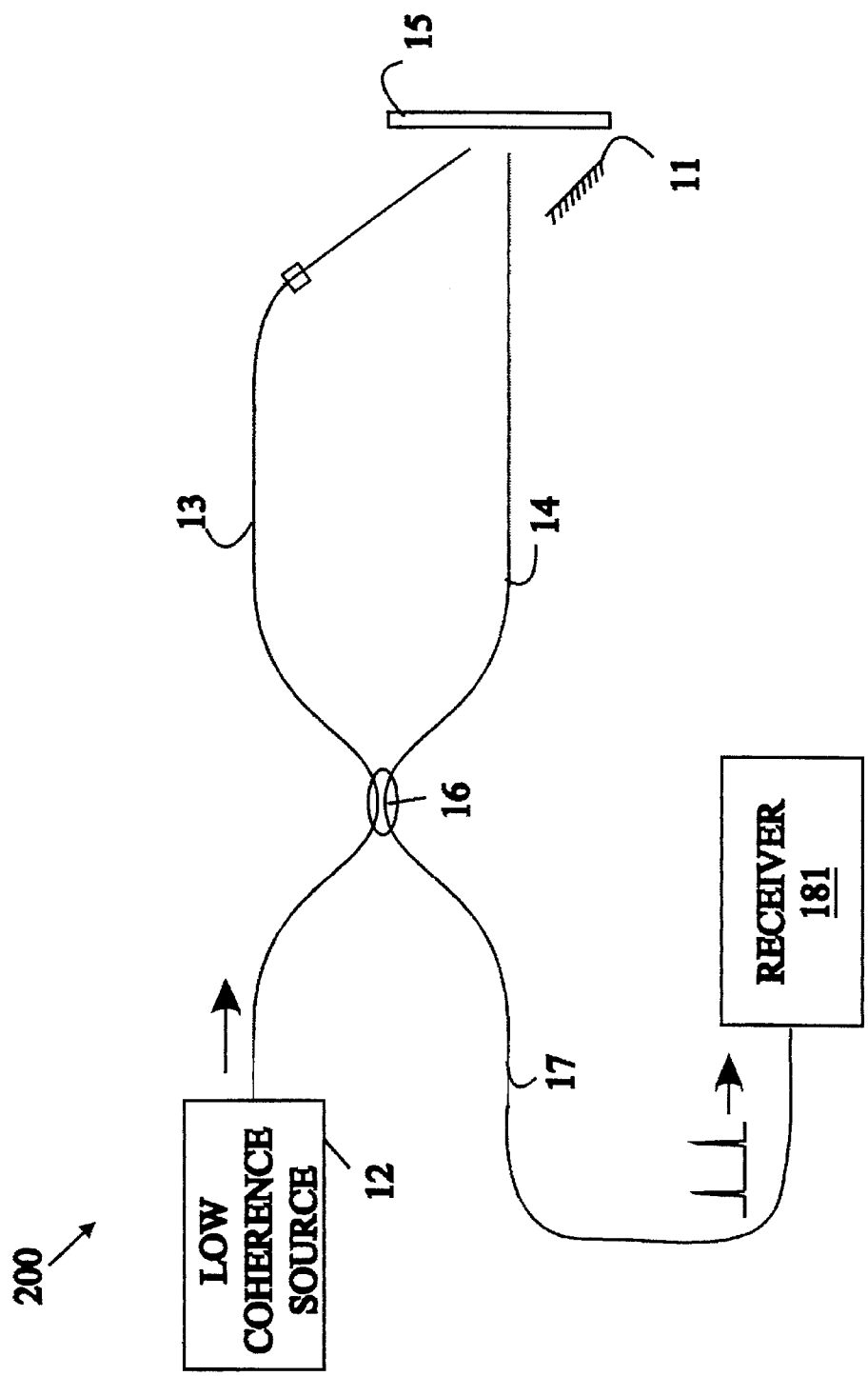

5,646,734

METHOD AND APPARATUS FOR INDEPENDENTLY MEASURING THE THICKNESS AND INDEX OF REFRACTION OF FILMS USING LOW COHERENCE REFLECTOMETRY

FIELD OF THE INVENTION

The present invention relates to optical reflectometry, and more particularly, to an apparatus for measuring the thickness and index of refraction of a film, sheet, or web.

BACKGROUND OF THE INVENTION

In many industrial processes, control of film thickness is of critical importance. For example, the manufacture of photographic film requires the generation of a uniform layer of emulsion on a backing. From the point of view of process control, it is advantageous to be able to measure the film thickness during the film generation process rather than measuring the film in a laboratory after the film has been manufactured. If samples are measured off-line, correction of any machinery malfunction cannot be performed until after a considerable volume of defective material has been processed. This leads to waste. For the purposes of the present discussion, the term "film" shall be deemed to include webs and sheets.

Prior art methods for measuring film thickness may be divided into contact and non-contact methods. In one contact method, a micrometer that comes in physical contact with both sides of the film is employed. These methods have the disadvantage of physically deforming the film during the measurement leading to inaccurate measurements and possible damage to the film from pitting or scratching. In addition, the methods are difficult to apply for the on-line measurement of fast moving film webs.

Non-contact methods based on the attenuation of a beam of subatomic particles or radiation such as beta particles or gamma rays are also known to the prior art. For example, the attenuation of a beam of electrons by the film is used to determine the film thickness in one prior art method of this type. This methodology has three disadvantages. First, the system must be calibrated for each type of film, since the attenuation depends on the chemical composition and density of the film. Second, the system typically relies on a radioactive source to generate the particle beam. It is generally desirable to limit the use of radioactive material for cost, safety, and psychological reasons. Third, access is normally required to both sides of the film so that the source can be placed on one side and the detector on the other.

Methods for measuring the thickness of films using an optical autocorrelator are also known to prior art. For the purposes of this discussion, an optical autocorrelator is defined to be an interferometer having a variable differential time delay. One embodiment of an optical autocorrelator is described, for example, in chapter 5 of Statistical Optics, by Joseph W. Goodman (John Wiley & Sons, 1985, pp. 157–170). Those skilled in the art are aware of the principles of operation of an optical autocorrelator, but certain principles will be clarified here because of their relevance to this patent. In an autocorrelating interferometer wherein light is split into two different paths and then recombined and directed to a photodiode, the detected light intensity is measured as a function of a parameter. This parameter can be the differential optical path length $\Delta L$ of the interferometer or it can be the differential time delay $\Delta t$ of the interferometer. These parameters are related by $\Delta L = n\,c\,\Delta t$, where c is the speed of light in vacuum and n is the group index of the medium (usually air) of the differential optical path. The detected light intensity expressed as a function of the differential time delay is called the coherence function of the input light. Hence, a receiver which determines the time delay between light reflected from different surfaces of a film performs the same function as a receiver which determines the path delay between light reflected from different surfaces of a film. Determining the spacing between peaks in the coherence function of the reflected light is yet another way to describe the same function. For the purposes of the present discussion, the term differential time delay shall include differential path delay.

A Michelson interferometer is an example of such an autocorrelator. An example of an apparatus for measuring film thickness which utilizes a Michelson interferometer is taught in U.S. Pat. No. 3,319,515 to Flournoy. In this system, the film is illuminated with a collimated light beam at an angle with respect to the surface of the film. The from and back surfaces of the film generate reflected light signals. The distance between the two reflecting surfaces is then determined by examining the peaks in the autocorrelation spectrum generated in a Michelson interferometer that receives the reflected light as its input. Unfortunately, this method can determine only the product of the group index and the film thickness. If a variation is detected in this quantity, additional measurements must be made to determine if the film composition has changed or the thickness has changed. The group index is defined to be the ratio of the propagation velocity of a light pulse in the medium relative to the velocity of propagation of the pulse in a vacuum.

Broadly, it is the object of the present invention to provide an improved apparatus and method for measuring the thickness and index of refraction of a thin film.

It is a further object of the present invention to provide a system that does not require contact between the film and the measuring device.

It is a still further object of the present invention to provide a system that can accommodate flutter in the film.

It is yet another object of the present invention to provide a system that can determine both the index of refraction and the film thickness independently.

It is a still further object of the present invention to provide a system that can determine both the index of refraction and the thickness of the film without requiring access to both sides of the film.

These and other objects of the present invention will become apparent to those skilled in the art from the following detailed description of the invention and the accompanying drawings.

SUMMARY OF THE INVENTION

The present invention comprises an apparatus and method for measuring the thickness of a film having top and bottom surfaces. The apparatus includes a first coupler or beam splitter for generating a first probe light signal and a second probe light signal from a low coherence light source. The first probe light signal is directed toward the top surface of the film at a first angle of incidence and the light leaving the top surface of the film is collected. Similarly, the second probe light signal is directed toward the top surface of the film at a second angle of incidence different from said first angle of incidence and the light leaving the top surface of the film is also collected. The collected light is combined to form a collected light signal which is input to a receiver that determines the time delay between light reflected from the top and bottom surfaces of the film. In the preferred embodiment of the present invention, the receiver is constructed from an optical autocorrelator or an optical spectrum analyzer that includes circuitry for providing the Fourier transform of the frequency domain spectrum measured from the combined light signal.

BRIEF DESCRIPTION OF THE DRAWINGS

FIG. 7 is a schematic drawing of a more general embodiment of the present invention.

DETAILED DESCRIPTION OF THE INVENTION

Figure 1:
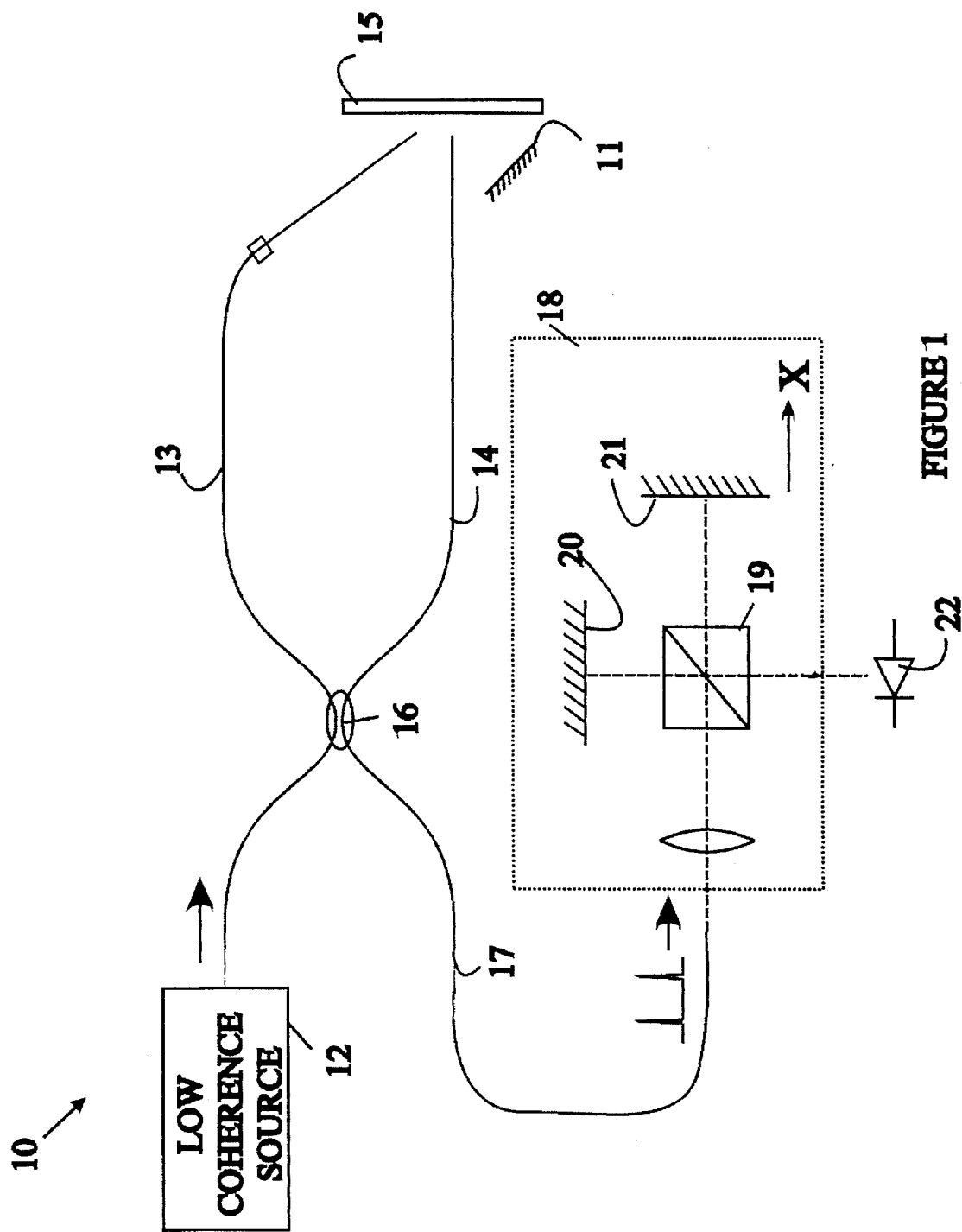
FIG. 1 is a schematic drawing of the preferred embodiment of a thickness monitoring apparatus according to the present invention.

The method by which the present invention attains its advantages over the prior art may be more easily understood with reference to FIG. 1 which is a schematic drawing of the preferred embodiment of a thickness monitoring apparatus according to the present invention. Apparatus 10 utilizes a low coherence light source 12 to generate a light signal that is split by a 3 dB coupler 16 into two parts that are applied to a film 15 whose thickness is to be measured. The light signals are applied via fibers 13 and 14. The first signal strikes film 15 at approximately normal incidence while the second signal strikes the film at an oblique angle. Light reflected from the surfaces of the film is collected by the optical fibers. A mirror 11 reflects the light from fiber 13 that is reflected by the film back into fiber 13. The collected light is combined by coupler 16 to provide an output light signal on fiber 17 which is sent to a receiver which is preferably an optical autocorrelator.

The coherence length of light source 12 must be small compared to the thickness of the film being measured. Such light sources are common in the optical reflectometry arts, and hence, will not be discussed in detail here. For the purposes of the present discussion, it is sufficient to note that an edge emitting light emitting diode may be utilized for light source 12.

An exemplary autocorrelator 18 constructed from a Michelson interferometer is shown at. The light incident on Michelson interferometer is split into two beams by beam splitter 19 that traverse different paths. The first path is determined by the position of fixed mirror 20 and the second by moveable mirror 21. After traversing the different paths, the light is recombined by splitter 19 and directed to a photodiode 22 which measures the intensity of the light which varies with the position of mirror 21 due to the interference of the light.

Figure 2:
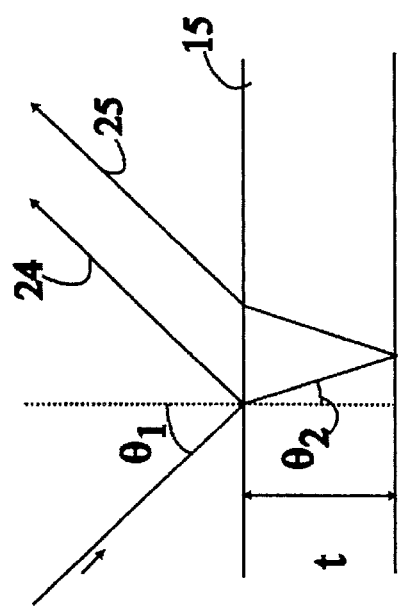
FIG. 2 is an expanded view of the surface of the film being measured.

Refer now to FIG. 2 which is an expanded view of the surface of film 15 in the region in which the oblique beam strikes film 15. Denote the index of refraction of the film by "n". The optical path delay, B, along path 25 relative to path 24 is given by $$B = \frac{2nt}{\cos\Theta_2}\left(1 - \frac{\sin^2\Theta_1}{n^2}\right) \quad (1)$$

where it is assumed that the group index and index of refraction are approximately equal. If this approximation is not satisfied, then $n^2$ in Eq. (1) must be replaced by $nn_g$ where $n_g$ is the group index, and the n in the numerator of Eq.(1) must be replaced by $n_g$.

The difference in optical path delay for the light signal at normal incidence, A, is given by $$A = 2n_s t \approx 2nt \quad (2)$$

Here, it is again assumed that $n \approx n_g$. The value of $\Theta_1$ is known from the geometry. The value of $\Theta_2$ is determined from $\Theta_1$ and n using Snell's law. Hence, Eqs(1) and (2) may be solved if A and B are known to determine n and t.

Figure 3:
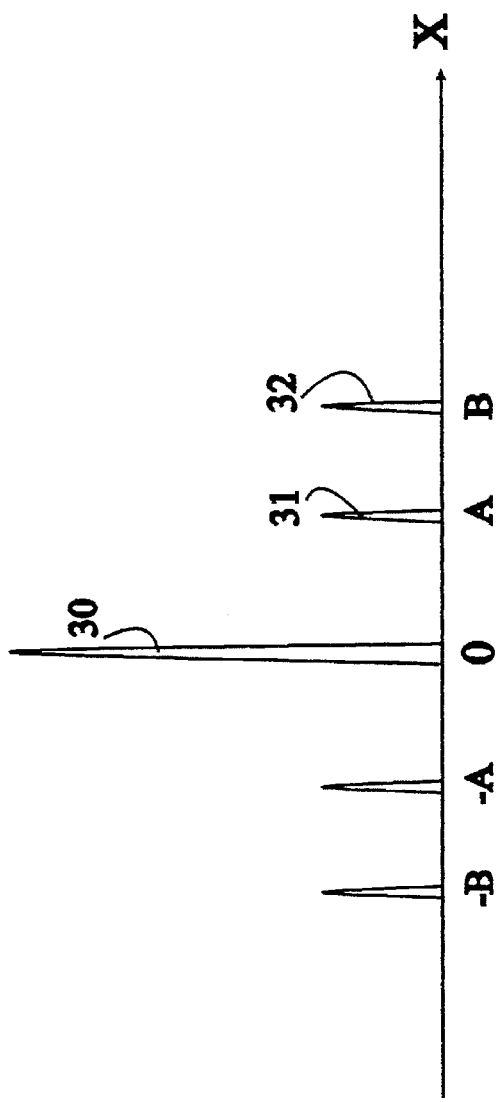
FIG. 3 illustrates the output generated by an autocorrelation receiver when used in the present invention.

The values of A and B can be determined from the output of the autocorrelator. Refer now to FIG. 3 which illustrates the output of autocorrelator 18. The large signal shown at 30 for x=0 is always present since any signal pattern input into the autocorrelator will always be correlated with itself. When the optical delay in one branch of the autocorrelator matches the delay between two reflections, a peak will appear in the output of the autocorrelator. This is a direct result of the low coherence length of light source 12. Hence, the output of the autocorrelator will have a peak 31 corresponding to the difference in the optical paths for the normally incident light that is reflected off of the front and back surfaces of the film. In addition, there will also be a peak 32 corresponding to the differences in paths for the oblique reflections from the from and back surfaces of the film. Since the signals in fibers 13 and 14 are derived from the same source, there will also be peaks corresponding to the overlap between reflections in the normally incident arm and those in the obliquely incident arm if the lengths of fibers 13 and 14 are equal. Since such peaks would complicate the interpretation of the data, the preferred embodiment of the present invention utilizes fiber lengths that avoid this problem. Finally, it should be noted that a symmetric peak pattern is also observed for negative x values.

Figure 4:
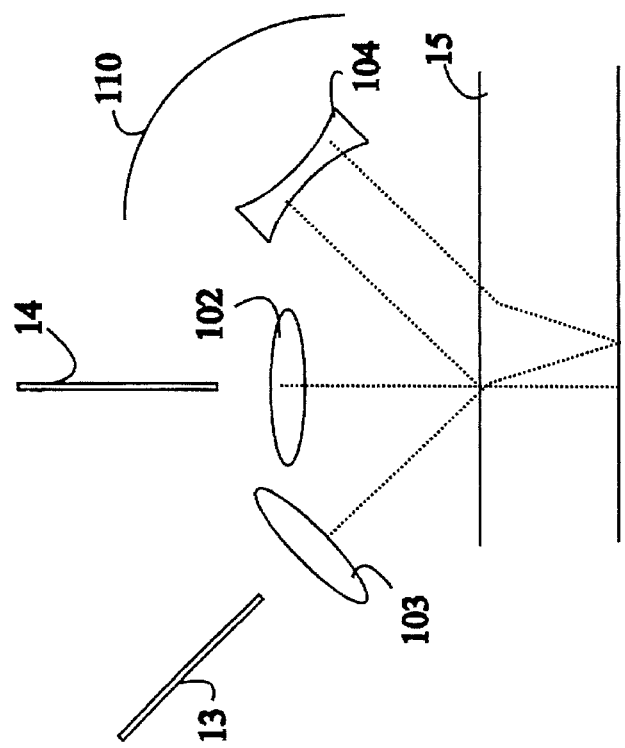
FIG. 4 is a cross-sectional view of the fiber ends and lenses used in the preferred embodiment of the present invention.

The above described embodiments of the present invention have been described in terms of two fiber ends placed in close proximity to the film. In the preferred embodiment of the present invention, the fiber ends are placed at some distance from the film to provide room for flutter and tolerance for angular variations in the reflective surface of the film that is inherent when the film flutters during rapid motion. To accommodate the added distance and provide the desired tolerance, lenses and reflective surfaces are utilized. The manner in which this arrangement operates may be more easily understood with reference to FIG. 4 which is a cross-sectional view of the fiber ends, lenses, and film under measurement. Light leaving fiber 13 is collimated with the aid of lens 103. Light leaving film 15 is focused back into fiber 13 by lens 104 and mirror 110. Similarly, lens 102 directs light leaving fiber 14 onto the film, collects the light reflected back from the film, and couples the light leaving the film and focuses the collected light back into fiber 14.

Figure 5:
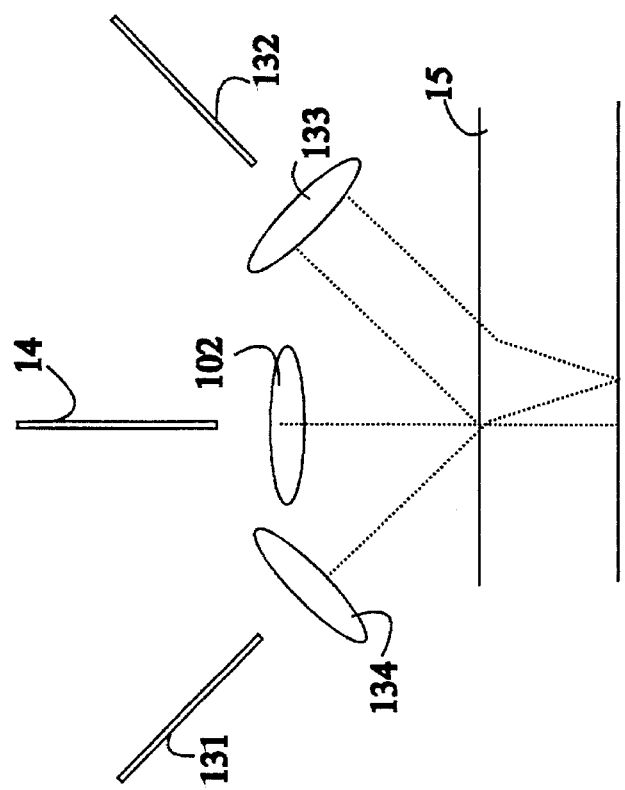
FIG. 5 is a cross-sectional view of the fiber ends and lenses used in an alternate embodiment of the present invention.

An alternate optical arrangement for providing the desired spacing is shown in FIG. 5. Here, fiber 13 is replaced by two fibers 131 and 132. Fiber 131 and lens 134 act as a light source providing a collimated beam directed at the film. Lens 133 and fiber 132 collect the light reflected from the film. The light from fiber 132 is combined with that from fiber 14 in a coupler prior to being received by the autocorrelator.

Although the above described embodiments of the present invention have utilized a Michelson interferometer as the autocorrelator, other forms of autocorrelator may be utilized. For example, an optical spectrum analyzer which measures the optical power as a function of wavelength or optical frequency can be utilized. The Fourier transform of the frequency domain spectrum provides an output which is identical to that of an autocorrelator.

Figure 6:
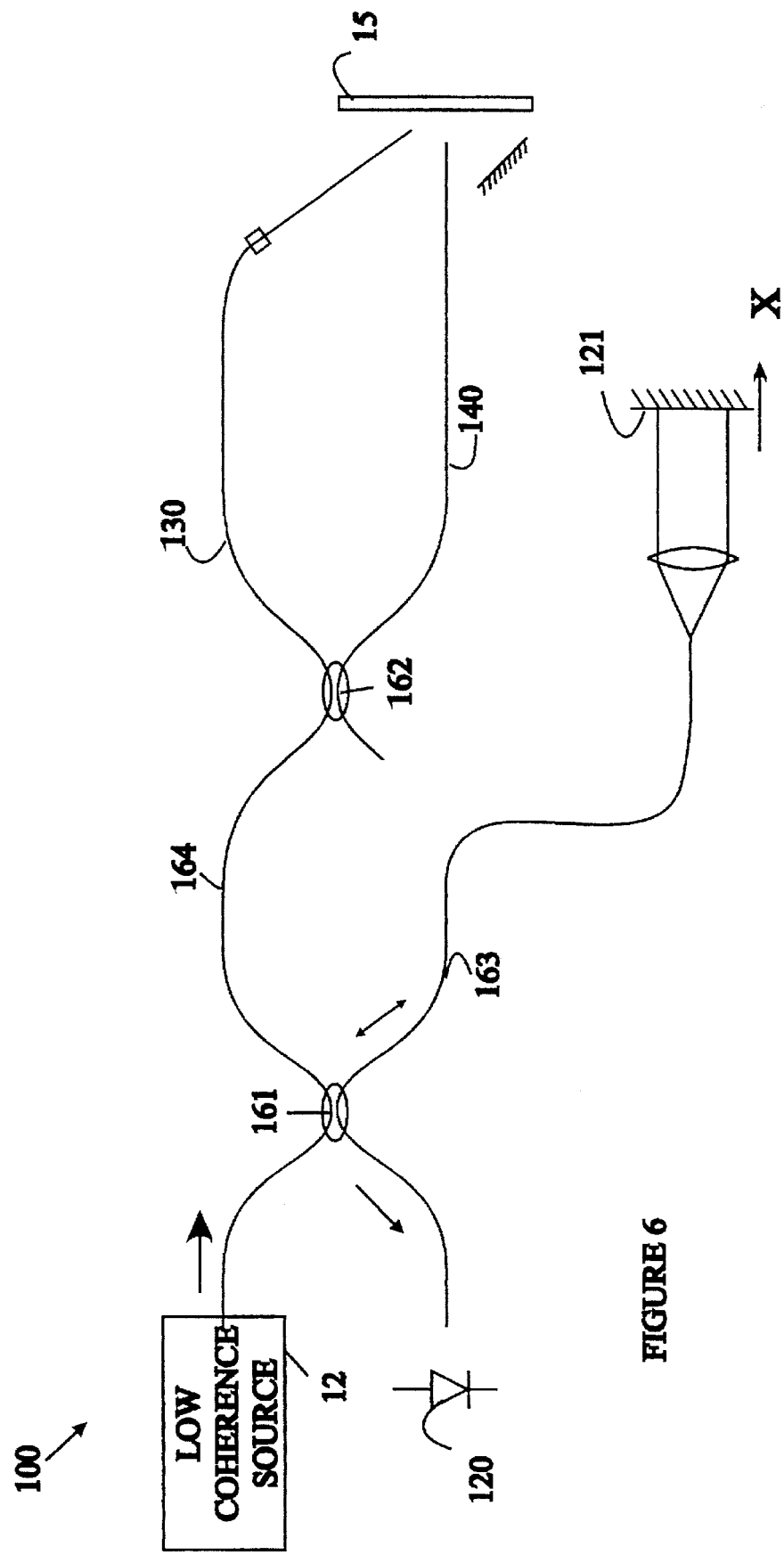
FIG. 6 is a schematic drawing of an embodiment of the present invention utilizing an optical reflectometer for the receiver.

While the above described embodiments of the present invention have utilized an autocorrelator for the receiver other types of reflectometer receivers may also be utilized. Such an alternate arrangement is shown at 100 in FIG. 6. The light from a low coherence source 12 is split into two signals by a first coupler 161. The signal on fiber 164 is split into two signals to form a probe pair comprising fibers 130 and 140 which applies these signals at two angles of incidence to film 15 and collects the light reflected back by film 15. The light collected is recombined with the second light signal generated by coupler 161 at coupler 161 after the second light signal has traversed a variable reference path comprising moving mirror 121. The signals combined at coupler 161 will undergo constructive interference when the delay in the reference path matches the transit time for the signals on the probe arm of the reflectomer. The intensity of the light leaving coupler 161 is measured by a photodetector 121. This type of receiver may be purchased commercially (Hewlett Packard HP8504 Precision Reflectomer). From the output of the photodiode as a function of the mirror position X, the film thickness and index of refraction may be determined as discussed above.

Any type of reflectometer having sufficient spatial resolution to distinguish the film reflections can be used in this configuration. This configuration, however, is not preferred because the results are sensitive to variations in the lengths of the various fibers. Such variations may occur due to temperature fluctuations or mechanical stress. In contrast, the results obtained with an autocorrelating receiver are independent of such fluctuations.

While the above embodiments of the present invention have been described in terms of two probe light signals, one at normal incidence and one at oblique incidence, it will be apparent to those skilled in the art that both signals could be applied at oblique incidence provided the angles of incidence are different. The above arrangement is preferred because the calculated results are less sensitive to alignment errors.

While the above discussion has referred to the film as having top and bottom surfaces, it will be appreciated by those skilled in the art that these terms are just convenient labels for the two surfaces of the film.

Various modifications to the present invention will become apparent to those skilled in the art from the foregoing description and accompanying drawings. Accordingly, the present invention is to be limited solely by the scope of the following claims. The above embodiments of the present invention have been described in terms of specific forms of detectors such as an autocorrelator. In general, any receiver capable of determining the time delay between light reflected from the top and bottom surfaces of the film may be utilized. A generalized embodiment of the present invention utilizing a receiver 181 is shown in FIG. 7 at 200. Those elements of this embodiment that serve the same functions as elements shown in FIG. 1 have been given the same reference numerals. As noted above, receiver 181 may be constructed from autocorrelator, optical spectrum analyzer, or reflectometer.

What is claimed is:

1. An apparatus for measuring the thickness of a transparent film having top and bottom surfaces, said apparatus comprising:

means for generating a first probe light signal and a second probe light signal from a low coherence light source;

first directing means for directing said first probe light signal toward said top surface of said film at a first angle of incidence and for collecting light leaving said top surface of said film;

second directing means for directing said second probe light signal toward said top surface of said film at a second angle of incidence different from said first angle of incidence and for collecting light leaving said top surface of said film;

means for combining said light collected by said first directing means and said second directing means to form a collected light signal; and a receiver for receiving said collected light signal and for determining the time delay between light reflected from said top and bottom surfaces of said film from said collected light signal.

2. The apparatus of claim 1 wherein said receiver comprises an optical autocorrelator.

3. The apparatus of claim 1 wherein said receiver comprises an optical reflectometer.

4. The apparatus of claim 1 wherein said receiver comprises an optical spectrum analyzer.

5. A method for measuring the thickness of a transparent film having top and bottom surfaces, said method comprising the steps of:

generating a first probe light signal and a second probe light signal from a low coherence light source;

directing said first probe light signal toward said top surface of said film at a first angle of incidence and for collecting light leaving said top surface of said film;

directing said second probe light signal toward said top surface of said film at a second angle of incidence different from said first angle of incidence and for collecting light leaving said top surface of said film;

combining said collected light from said first and second probe light signals to form a collected light signal; and determining the time delay between light reflected from said top and bottom surfaces of said film from said collected light signal in a receiver.

6. The method of claim 5 wherein said receiver comprises an optical autocorrelator.

7. The method of claim 5 wherein said receiver comprises an optical reflectometer.

8. The method of claim 5 wherein said receiver comprises an optical spectrum analyzer.

* * * * *

UNITED STATES PATENT AND TRADEMARK OFFICE
CERTIFICATE OF CORRECTION

PATENT NO : 5,646,734

DATED : July 8, 1997

INVENTOR(S) : Venkatesh, et al.

It is certified that error appears in the above-identified patent and that said Letters Patent is hereby corrected as shown below:

Column 1, line 66, "$\Delta L = n\, c\, \Delta t$," should read
-- $\Delta L = c\Delta t/n$, --;

Column 2, line 29, "the medium" should read
-- a vacuum --;

Column 2, line 30, "a vacuum" should read
-- the medium --.

Signed and Sealed this

Twenty-sixth Day of May, 1998

Attest:

BRUCE LEHMAN

*Attesting Officer*     *Commissioner of Patents and Trademarks*